July 16, 1968  M. H. STEINBERG  3,393,010
SAFETY BAR
Filed May 3, 1967
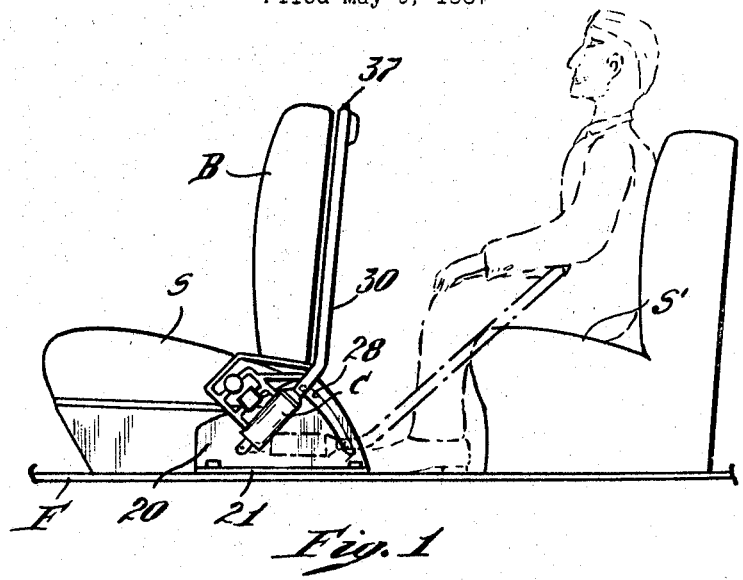
Fig. 1
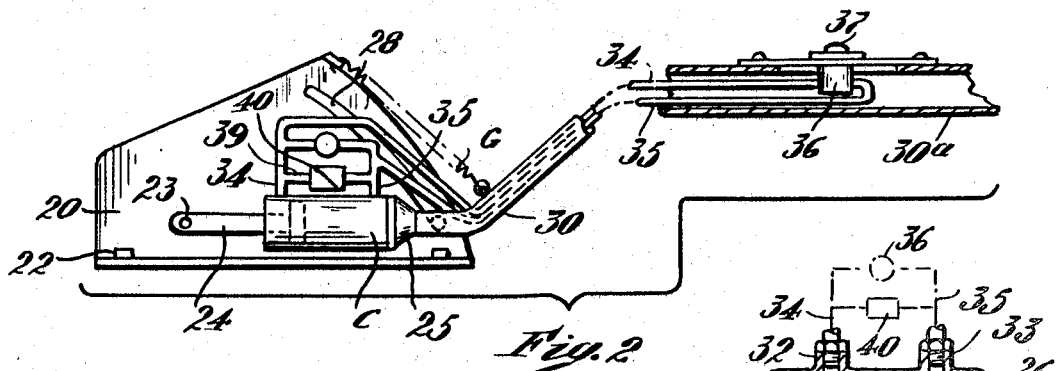
Fig. 2
Fig. 6
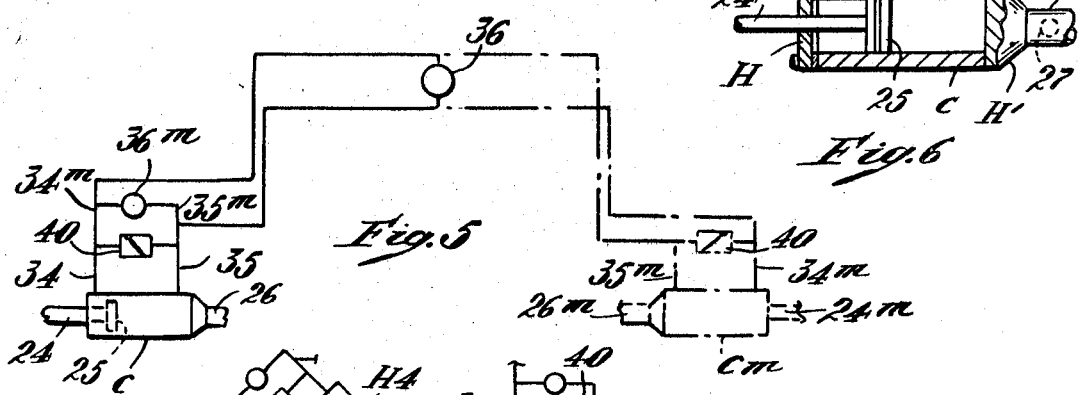
Fig. 5
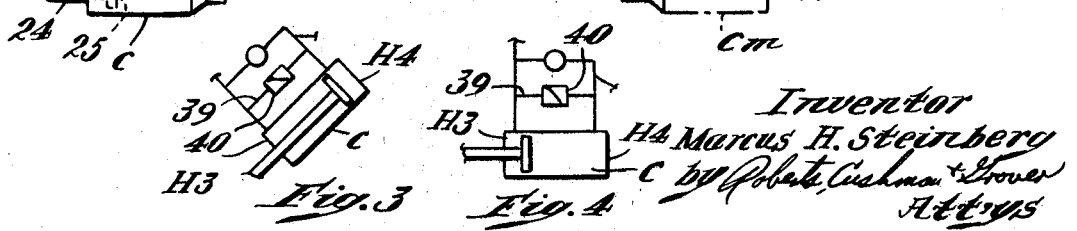
Fig. 3   Fig. 4
Inventor
Marcus H. Steinberg
by Roberts, Cushman & Grover
Attys United States Patent Office 3,393,010
Patented July 16, 1968

3,393,010
SAFETY BAR
Marcus H. Steinberg, 23 Duke St.,
Mattapan, Mass. 02126
Filed May 3, 1967, Ser. No. 635,781
7 Claims. (Cl. 297—390)

ABSTRACT OF THE DISCLOSURE

A safety device useful in motor vehicles, airplanes, or the like, in substitution for the customary seat belt, comprising a restraining bar which, when in use, extends horizontally across the lap of a person in the rear seat of a vehicle and, when not in use, fits snugly against the back of the front seat, and which, in operative position, is releasably held in place by hydraulic pressure.

Background of the invention

The importance of preventing persons seated in a vehicle from being thrown forward violently when the vehicle is suddenly stopped, as by the sudden application of brakes when travelling at high speed or in collision has become generally recognized and the provision of safety belts or equivalent device is widely recommended and in some States required by law.

While a properly constructed and fastened belt is effective, the cost of such belts is substantial; the fastening of such a belt is somewhat troublesome, requiring the use of both hands, and it is particularly difficult when it is attempted, by a person in the front seat, to adjust and fasten the belt for a person in the rear seat as is sometimes necessary when applying the belt to a child or when it is attempted by a taxi driver to fasten the belt for a person in the rear seat who is unable himself to do so; and the prompt release of the belt in an emergency situation is not always possible. The result of these factors is that even though belts may be provided, they are in many instances disregarded with consequent injury to a person left unrestrained.

Summary

The present invention has for objects the provision of a restraining device which avoids most of the above undesirable features of the customary seat belt, that is to say, to provide a restraining device which may be made at a moderate price; which does not have the girth confining and tiring restraint of a belt; which may be shifted from inoperative position to operative position by the use of but one hand and as readily released and restored to its inoperative position; which is easily manipulated by a person sitting in a front seat in applying it to a person in the rear seat; and which in performing its intended function does not cause undue pain or injury to the person using it.

In the attainment of the above objects the invention provides a substantially rigid horizontal bar (which may be cushioned, if desired) and which, in use, extends transversely across or above the lap of the passenger and which, if desired, may be of a length to provide restraint for two or more persons sitting in the same rear seat of the vehicle. The bar is carried by at least one and preferably two rigid radius arms, each secured at its upper end to one end, respectively, of the bar, each arm extending downwardly and having its lower end rigidly connected to one end of a pivotally supported cylinder constituting an element of the hydraulic locking device, said locking device, as more fully described hereinafter, including conduits and valve means and being so devised that the mere swinging of the bar down to operative position automatically locks it in place, from which it may be released only by pressing a button whereupon, in accordance with a preferred arrangement, it will be swung upwardly automatically to inoperative position where it will remain until manually moved down to the position of use. The hydraulic locking device is of such dimension that it may be installed between the end of the front seat and the wall of the car and is so designed that it may be bolted to the car floor and thus installed in the simplest possible way. For simplicity and low cost of manufacture it is proposed to provide conduits for hydraulic fluid of flexible material such, for example, as nylon tubing which, if desired, may be provided with a jacket of textile or other ornamental material.

Other objects and advantages of the invention will be pointed out in the following more detailed description and by reference to the accompanying drawings wherein:

FIG. 1 is a somewhat diagrammatic side elevation showing two conventional vehicle seats and the restraining device of the present invention indicated in inoperative position in full lines and in the operative position in broken lines;

FIG. 2 is a side elevation of the restraining device, removed from the car and with certain parts broken away and in section, showing the restraining device to larger scale than in FIG. 1 and turned horizontally 90° from actual position;

FIG. 3 is a diagrammatic small scale line-drawing showing the hydraulic cylinder and associated devices when the restraining device is in inoperative position;

FIG. 4 is a view similar to FIG. 3, showing the hydraulic cylinder and associated parts when the restraining device is in operative position;

FIG. 5 is a diagram illustrating in full lines the hydraulic circuit of FIGS. 1 and 2, and in broken lines suggesting an alternative arrangement wherein the hydraulic circuit comprises a hydraulic cylinder at each side of the front seat of the vehicle; and FIG. 6 is a fragmentary longitudinal, diametrical section, showing the hydraulic cylinder, and, in broken lines, indicating the hydraulic circuit.

Referring to the drawings, in FIG. 1 the character F designates the floor of the vehicle and the characters S and S1 designating two conventional seats, the seat S being herein referred to as the "front seat" and the character S1 designating a seat referred to as the "rear seat," while the character B designates the back of the seat S. This arrangement of seats is such as is conventional in the usual automobile but since it is contemplated that the present invention is applicable to other vehicles, such as busses or airplanes, wherein more than two seats are customary, it will be understood that the seats S and S1 here suggested are to be regarded as symbolic of any two seats, one of which is behind the other.

Referring to FIG. 2 the numeral 20 designates a rigid vertical plate, for example, of steel, having a horizontal flange 21 at its lower edge which will rest on the floor of the vehicle and which may be secured to the floor by bolts 22. As illustrated in FIG. 1 this plate, with its attachment, is mounted at one end of the seat S in the space available between the end of the seat S and the side wall (not shown) of the vehicle. A rigid horizontal stud 23 projects from the plate 20 and provides a fulcrum axis for one end of a piston rod 24 which enters, leak-tight, through a central bore in one head H (FIG. 6) of a cylinder C and has a piston 25 attached to its inner end, this piston being slidable within the cylinder but having piston rings or equivalent means operative to prevent the leakage of fluid past the piston from one end of the cylinder to the other. The cylinder C is closed at its right-hand end as viewed in FIG. 2 by a head H1. The head H1 has an elongate rigid boss 26 from which there projects a stud 27 constituting a cam follower which slides within an arcuate camway 28 (FIGS. 1 and 2) formed in the plate 20. This cam-way is eccentric with reference to the stud 23. An elongate rigid member 30, herein referred to as a "radius rod" or "arm" which is desirably of steel and tubular, and has an outside diameter of three-fourths of an inch, for example, is rigidly secured at its lower end to the cylinder-boss 26 and at its opposite end is bent at right angles to provide the horizontal restraining bar 30a which, if desired, may be provided with a cushion or padding (FIG. 1). While it is preferable, from the matter of simplicity, to make this bar 30a integral with the radius rod 30, it is contemplated that the bar may be made as a separate element, for example, of a different material and of non-circular transverse section, if desired, to the end of providing the highest degree of comfort to the user.

Spaced inwardly from its opposite ends the cylinder C is provided with nipples 32 and 33 (FIG. 6) whose interiors communicate with the interior of the cylinder and which provide for the attachment of conduits 34 and 35 which, for convenience and for reduction in cost of construction, may be of flexible tubing, for example, nylon or other flexible plastic tubing which, if desired, may be provided with ornamental jackets of textile material or the like (not here shown). Both of these conduits 34 and 35 are arranged to enter an aperture in the side of the tubular radius rod 30 and extend along, within the latter, and thence into the bar 30a, as shown in FIG. 2, and into the casing 36 of a push-button type valve having an actuating button 37. This valve 36 normally closes the circuit comprising the conduits 34 and 35 but may be opened by pressing the button 37 so as to permit free flow of fluid along the circuit.

As shown in FIG. 2 the circuit assembly comprises a short-circuiting conduit 39 connecting the conduits 34 and 35 closely adjacent to their emergence from the nipples 32 and 33 and within this short-circuiting conduit there is arranged a check valve 40.

The principle of operation of the device may be understood by reference to the diagrams of FIGS. 3 and 4. As indicated in FIG. 3, the cylinder C is in the inclined position as shown in dotted line in FIG. 1 with the bar 30a in inoperative position. In this position the piston 25 is located near the upper end of the cylinder C so that the chamber $H^3$ to the left of the piston is substantially larger than the chamber $H^4$ to the right of the piston. Because of the eccentricity of the cam slot 28 relative to the pivotal axis 23 about which the piston rod may swing, any attempt to swing the radius rod 30 downwardly from the position of FIG. 1, with resultant movement of the cylinder C in the clockwise direction will be resisted by the fact that such motion requires the transfer of fluid from the chamber $H^3$ to chamber $H^4$. This would be prevented (since valve 36 is normally closed) were it not for the bypass 39 whose check valve 40 will open to permit flow of fluid from left to right (FIG. 2) through the bypass conduit 39. Because of this bypass, the fluid may flow from chamber $H^3$ to chamber $H^4$ and thus the cylinder may be swung down to the position of FIG. 4 with concomitant downward motion of the bar 30a to the operative position of FIG. 2. When once placed in this position it may not be restored to inoperative position except the valve 36 be first opened by pressing the button 37, since the check valve 40 will not permit flow of fluid from right to left (FIG. 2) through the bypass conduit 39. However, if the valve 36 is opened, the bar 30a may easily be raised (assisted by a spring G, FIG. 2) which will retain it in the inoperative position when once restored thereto. While a conventional spring latch might be provided for retaining the bar in its inoperative position it is preferred to use only a simple spring like the spring G which requires no manipulation to release the bar for downward movement.

In order to permit ready release of the bar from operative position by an occupant of the front seat, for example the driver of a taxi cab, the locking device may comprise a secondary circuit consisting, as shown in FIG. 5, of branches 34m and 35m (beyond the bypass 39) extending from the conduits 34 and 35 respectively, to any desired point, where they are connected to a valve 36m such as the valve above described, which is normally closed but which may be opened, for example, by pressure on a button—this second valve being located within easy reach of an occupant of the front seat.

It is preferable, when the matter of expense is not too important, to provide a replica of the supporting plate 20, with its attachments, at the right-hand end of the seat S, with a corresponding hydraulic circuit, as indicated in broken lines in FIG. 5 where corresponding parts are designated by the same reference characters as in full line position (FIG. 5) except with superscripts.

Even if the duplication of the hydraulic system at the right-hand end of the seat is not deemed expedient, a radius rod such as the rod 30 is desirable for supporting the right-hand end of the bar 30a but with the lower end of the radius arm 20a merely pivoted at a point near the vehicle floor to rock about an axis coaxial with the axis 23 above referred to, and with the upper end of the rod secured to or integral with the bar 30a. However, by making the radius rod 30 of sufficiently rigid material and by reason of the guide slot 28 and the substantial spacing of the pivot 23 from the guide slot, it is contemplated that a single radius rod at one end of the bar 30a may be sufficient to provide the desired restraint.

While it might perhaps be possible, in theory at least, to lock the restraining device in its operative position, by the use of mechanical devices, such as ratchets and pawls with releasing levers or the like, such devices are noisy and require lubrication and are hardly consistent with the finely finished and even ornamental appearance expected in modern passenger automobiles or airplanes, while the manipulation of such devices demands some knowledge at least of the principles of mechanics.

As contrasted with pawl and ratchet arrangements, the present device requires no more than the grasping of the bar and the application of a slight downward pull to accomplish the smooth and noiseless movement on the bar down to its locked, operative position, while the mere pressure of the switch button is all that is required to release the restraining bar and permit its restoration to inoperative position. While the device does comprise certain mechanical devices, they are small in dimensions so that the locking means may readily be interposed between the end of the seat and the wall of the vehicle without requiring any modification of the latter, a position where the locking means is scarcely observable except by a person taking particular pains to examine it.

While one desirable embodiment of the invention has herein been disclosed by way of example, it is to be understood that the invention is broadly inclusive of any and all equivalent means having the same functional capabilities as that herein disclosed.

I claim:

1. A restraining device for use with a vehicle seat comprising, in combination, a substantially horizontal bar secured at one end, at least, to the free end of a rigid radius rod, the opposite end of the radius rod being pivotally supported, adjacent to the floor of the vehicle so that the radius rod may rock from front to rear, the bar normally being disposed in inoperative position adjacent to the back of a front seat, and hydraulic locking means operative to lock the radius rod and the bar in operative position, with the bar overlying the knees of the occupant of the seat.

2. A restraining device according to claim 1, further characterized in that the hydraulic means comprises a cylinder having therein a piston secured to one end of a piston rod, the rod extending outwardly leak-tight from one end of the cylinder, means defining a horizontal fulcrum axis about which the piston rod may swing, means securing the radius rod to the opposite end of the cylinder, a cam follower carried by the cylinder at the last-named end thereof, means providing a curved cam-way for the cam follower, said cam-way being eccentric with reference to the pivotal axis of the piston rod, whereby, as the cylinder is swung about said axis the piston moves lengthwise of the cylinder, conduits leading from opposite ends of the cylinder and providing a passage for hydraulic fluid, and valve means normally operative to close said passage whereby hydraulic pressure prevents swing of the radius rod and bar from operative position except when said valve is opened.

3. Apparatus according to claim 2, further characterized in that the conduits which lead from the opposite ends of the cylinder extend along the radius rod to its junction with the horizontal bar and then along the latter approximately to the midpoint of the bar, and valve means located approximately at said last-named point where it is readily accessible for manipulation by an occupant of the rear seat.

4. A device according to claim 2, further characterized in having a short-circuiting conduit connecting the aforesaid conduits adjacent to the points at which they emerge from the cylinder, and a check valve within said short-circuiting conduit, said valve permitting fluid to flow from one conduit to the other as the bar is swung down into operative position, but preventing reverse movement of the bar except as the valve carried by the bar is manually opened.

5. The combination according to claim 1, further characterized in that each of the opposite ends of the bar is secured to a radius rod, the two radius rods being spaced apart a distance slightly exceeding the width of a front seat, and the means for pivotally mounting the two radius rods providing coaxial fulcrum axes about which both rods may swing simultaneously.

6. In combination with a front and rear vehicle seat, a substantially horizontal bar normally positioned adjacent to the upper part of the back of the front seat, parallel radius rods connected at their upper ends to the opposite ends, respectively, of the bar and having their lower ends supported to rock about coaxial fulcrum axes located at opposite ends, respectively, of the front seat, and control means associated with the lower end of at least one of said radius rods, said control means comprising a hydraulic cylinder having a piston therein, means providing a passage through which fluid may flow from one side of the piston to the other, valve means mounted upon said bar which normally closes said passage, and manually actuatable control means whereby the valve may be opened thereby permitting the bar to be released from operative position wherein it is locked by hydraulic pressure.

7. A restraining device according to claim 3, wherein the conduits which lead from opposite ends of the cylinder have branches which extend to a valve located conveniently to an occupant of the front seat, whereby said occupant may, by pressing the actuating button of the latter valve, unlock the bar and permit it to be restored to inoperative position.

References Cited

UNITED STATES PATENTS

| | | | |
|---|---|---|---|
| 2,801,866 | 8/1957 | Naslund. | |
| 3,095,170 | 6/1963 | Harb | 297—390 X |
| 3,198,543 | 8/1965 | Presunka | 280—150 |
| 3,203,709 | 8/1965 | Presunka et al. | 280—150 |
| 3,262,716 | 7/1966 | Graham | 280—150 |

JAMES T. McCALL, *Primary Examiner.*